Aug. 4, 1931.  H. J. KRATZER  1,817,006
POWER TRANSMISSION SYSTEM
Filed Jan. 3, 1928
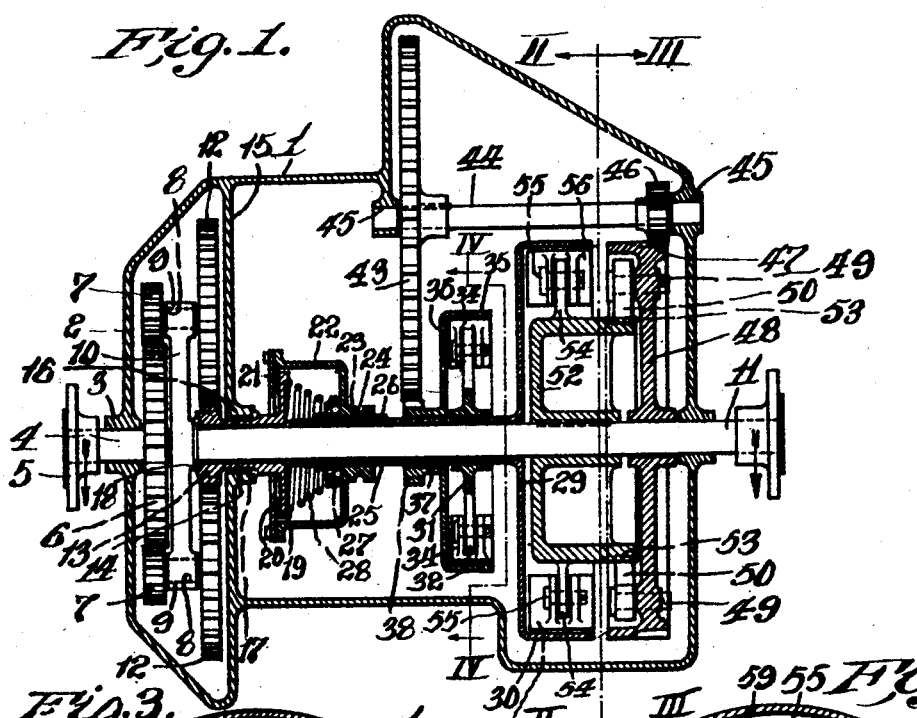
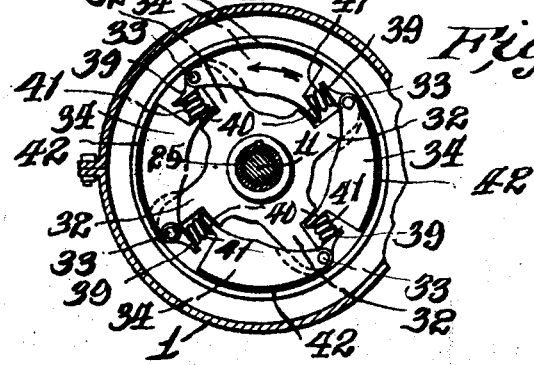
Inventor:
H. J. Kratzer,
By H. E. Fletcher
Atty.

Patented Aug. 4, 1931

1,817,006

UNITED STATES PATENT OFFICE

HERBERT J. KRATZER, OF ST. LOUIS, MISSOURI

POWER TRANSMISSION SYSTEM

Application filed January 3, 1928. Serial No. 244,158.

This invention relates to improvements in a power transmission system such as used in vehicles and the like and has for its primary object the purpose of providing a reliable and simple selectively controlled clutch therein that will not slip when the load member rotates in excess of a predetermined speed and in which the load member will not seize when the clutch is suddenly or abruptly let in.

A further object of the invention is in providing an improved power transmission system in which means are provided therein whereby the clutch will automatically disengage when the load member rotates slower than a predetermined speed and in which the clutch will automatically reengage when the motor driven member of the system rotates above a predetermined speed.

A further object of the invention is in providing the transmission system with a means which will transmit a large per cent of instantaneous motor torque values to the load member direct through constantly meshed gear train and in which a small amount of motor torque is transmitted through the control clutch of the system.

A still further object of the invention is in providing means in the power transmission system which will gradually and automatically cut out the counter shaft gear train as the load shaft or member increases in speed and rotates in excess of a predetermined speed thereby directly transmitting the smaller amount of motor torque through the control clutch as well as permitting the larger amount of motor torque being offered direct through a planetary gear train.

Other and further objects will appear in the specification and be specifically pointed out in the appended claims, reference being had in the accompanying drawings, exemplifying the invention, and in which:

Figure 1 is a horizontal section taken through this improved transmission power system and the enclosing housing.

Figure 2 is a transverse vertical section taken approximately on the line II—II of Fig. 1.

Figure 3 is a transverse vertical section taken approximately on the line III—III of Fig. 1.

Figure 4 is a transverse vertical section taken approximately on the line IV—IV of Fig. 1.

Referring by numerals to the accompanying drawings, 1 designates a stationary held oil tight housing which encloses all of the operative parts of the transmission system and extending through the front part 2 of the housing and reposing in a bearing 3 is a stub drive shaft 4 which may be connected to the shaft of an internal combustion motor or other power source by the flange 5.

Secured to the shaft 4 inside of the housing 1 is a gear 6 and in mesh with said gear are a pair of diametrically opposed planet gears 7, each of said gears being secured to one end of a respective short shaft 8 each being mounted in a bearing 9 formed in a supporting member 10 which is securely mounted on the load-shaft 11. Mounted on the opposite end of each of the shafts 8 is a gear 12, each of said gears being turnable with respective shafts 8 and planet gears 7, said gears 12 both being in mesh with the slip torque pinion 13 which is formed integral with the sleeve 14, said sleeve being turnable on the shaft 11.

A web 15 is provided in the housing 1, said web having a bearing 16 formed therein in which a ball race 17 is disposed for cooperation with the sleeve 14, and mounted between the member 10 and the pinion 13 is a ball race 18.

Mounted on the sleeve 14 on the end thereof opposite to where the pinion 13 is located, is a clutch disc 19 having a friction annulus 20 secured thereto, said clutch disc 19 adapted to cooperate with a friction plate 21 of a clutch housing 22. The opposite end of the clutch housing is provided with a hub 23 having an annular groove 24 formed therein, said hub being mounted on a sleeve 25 which is turnable on the load shaft 11, said hub 23 being turnable with said sleeve and slidably held thereon by the key 26.

Loosely mounted on the hub 23 of the clutch housing 22 inside of the clutch housing is a collar 27 having a spring seat formed thereon and in engagement with the seat of said collar is a helical spring 28, the opposite end of said spring bearing against the clutch disc 19.

Formed integral with the sleeve 25 at its rear end is a flange 29 having a concentrically disposed and horizontally formed clutching annulus 30 and disposed intermediate of the length of the sleeve 25 is a hub 31 having a series of radially extending arms 32, said hub 31 being securely fixed to said sleeve and turnable therewith. Pivoted at 33 to each arm 32 is a weight 34 and circumferentially disposed around said weights is a clutching portion 35 of a flange 36, the hub portion 37 of said flange 36 being turnable on the sleeve 25 and formed on said hub is a pinion 38. Each of the weights 34 is provided at one end with a lip 39 and at their opposite ends with a lip 40, a lip 39 of one arm and a lip 40 of an adjacent arm overlapping and having a coil spring 41 therebetween, said springs normally holding the outer periphery 42 of each weight from engagement with the clutching portion 35 of the flange 36.

In mesh with the pinion 38 of the flange 36 is a gear 43, said gear being keyed to a countershaft 44, the ends of said shaft being supported in bearings 45 which are formed in the housing 1, said gear 43 being mounted adjacent one end of said shaft and keyed to said shaft adjacent its opposite end is a pinion 46, said pinion being in mesh with a gear 47 which is loosely mounted on the load shaft 11. Secured in and horizontally extending from the web portion 48 of the gear 47 are series of pins 49 and swingable on each pin is a pawl 50, each being actuated by a respective spring 51.

Keyed to the load shaft 11 inwardly of the gear 47 is a drum 52 and formed on the outer periphery of said drum are a series of teeth 53, the teeth of said series being unequal to the number of the series of the pawls 50 carried by the gear 47, said pawls being cooperable with respective teeth. Extending upwardly from the drum 52 are a series of arms 54 and pivoted at 55 to each arm is a weight 56, the periphery 57 of each weight being adapted to contact with the inner periphery of the clutching annulus 30 of the flange 29 which is formed at one end of the sleeve 25. The weights 56 are normally held from contact with the inner periphery of the clutching annulus 30 by the springs 58, said springs being interposed between respective lips 59 of respective weights 56.

With this improved power transmission system assembled as described and it is desired to start the motor (not shown) without transmitting any power effort to the load shaft 11, the hub 23 of the clutch housing 22 is moved forwardly on the sleeve 25 against the action of the spring 28 by the clutch lever (not shown in which a part of the clutch lever will be engaged in the groove 24 of the collar 23) and in which the friction plate 21 of the clutch housing 22 will be moved from contact with the friction annulus 20 of the clutch disc 19. The motor is then started and inasmuch as the shaft of the motor is coupled with the flange 5 which is mounted on the shaft 4, said shaft 4 will be turned and in consequence the gears 6, 7, 12, and 13 will be free to revolve as the clutch disc 19 and clutch plate 21 are out of contact, and the supporting member 10 of the gears 7 and 12 will not move for the reason that the slip torque pinion 13 which is mounted on the sleeve 14 will permit total frictionless escapement of all turning effort presented to the slip torque pinion 13.

After the motor is started and assuming that it is idling at about 100 R. P. M., and it is desired to transmit turning effort to the load shaft 11, the clutch housing 22 is permitted to move rearwardly by the action of the spring 28 thereon upon release of the clutch lever, thereby sliding the clutch housing 22 on the sleeve 25, this rearward movement of the clutch housing 22 permitting the friction plate 21 of the housing to frictionally contact with the annulus 20 of the clutch disc 19 and in which the clutch disc 19 will cause the clutch housing 22 to revolve therewith and as said clutch housing 22 is slidingly keyed on the sleeve 25, said sleeve will be revolved therewith. By reason of the hub 31 being rigidly secured to the sleeve 25 as well as the flange 29 being formed integral with said sleeve, said hub and said flange will therefore be revolved with the sleeve and at the speed of the slip torque pinion 13 due to the turning of the gear 6 at 100 R. P. M. with the result that the weights 34, one of which is carried by a respective arm 32 of the hub 31, will be revolved at a much greater speed than the gear 6 and at a speed of approximately 800 R. P. M. As the weights 34 revolve at increasing speed they will exert an increasing outward radial force which force up to the speed of approximately 800 R. P. M. will be sufficiently resisted by the springs 41 so as to keep them away from engaging the clutching portion 35 of the flange 36 in which there will be a continued escapement and a free running motor at the speed of 100 R. P. M. even though the selective control clutch (which is comprised of the clutch housing 22 and cooperating parts) is let in, thereby providing for the motor running at low speeds without stalling the motor.

With a slight acceleration of the motor speed from 100 to 125 R. P. M. approximately, the revolving speed of the sleeve 25 will be of a consequence increased from 800 to 1000 R. P. M. approximately and as the radial centrifugal force increases as the square of the speed with respect to the weights 34, the resisting pressure of the springs 41 of said weights will be overcome thereby permitting said weights to engage the inner periphery of the clutching portion 35 of the flange 36 to an increasing degree with increasing speed of rotation and in which turning power will be transmitted from the weights to the portion 35 of the flange 36 and the pinion 38 of the hub portion 37 of the flange 36 will also receive rotation, said pinion 38 transmitting turning power to the gear 43 and consequently to the counter-shaft 44 and the pinion 46 on said shaft and as said pinion is in mesh with the gear 47 which is loosely mounted on the load shaft 11, said gear 47 will be turned thereby.

Inasmuch as the web portion 48 of the gear 47 carries a series of spring actuated pawls 50, one of said pawls will engage a tooth of the series of teeth 53 of the drum 52, said drum thereby being revolved at the speed at which the gear 47 is revolved and as said drum is provided with a series of arms 54 each carrying a pivoted weight 56, said weights will also revolve at the speed of the drum 52.

As the load shaft 11 acquires a certain predetermined speed as it is being accelerated by the motor through the countershaft 44, gear 47, pawls 50 and drum 52 which is keyed to said shaft, the weights 56 by reason of the centrifugal force applied thereto will overcome the outward pressure of the springs 58 and the periphery 57 of said weights will gradually come in contact with the inner periphery of the clutching annulus 30 of the flange 29 which is rotating much faster than said weights, the periphery 57 of said weights gradually engaging the annulus 30 thereby decreasing the speed of said annulus and totally equalizing the rotating speed of the weights 56 and the annulus 30. Simultaneous with the decreasing speed of the annulus 30, the centrifugal force that caused the engagement of the weights 34 with the portion 35 of the flange 36 also decreased, thereby permitting the springs 41 to overcome the decreased centrifugal force of the weights 34 and move said weights from contact with the portion 35 of the flange 36 thus cutting off power transmission to the flange 36 and of a consequence the counter-shaft 44 will not transmit power to the gear 47, and the pawls 50 of said gear will override the teeth 53 of the drum 52. This cutting off of transmitting power to the counter-shaft throws the full load direct on the load shaft as the torque escapement has been stopped and therefore the planet gears are restrained from turning on their respective axes and in which said gears will turn as a whole with the axes of the crank shaft of the motor and the load shaft 11 and with all of the parts excepting the countershaft gear train turning as a unit.

In the event that the load shaft torque demand slows the speed of the motor and necessarily the load shaft to a degree sufficient to permit the centrifugal force on the weights 56 to be lessened in which the frictional contact of said weights will be cut off from engagement with the annulus 30 of the flange 29, the motor will thereby momentarily be unloaded resulting in the sleeve 25 being revolved faster by reason of the load being taken from the motor and in which the increased speed of the weights 34 which are carried by the hub 31 will again peripherally engage with the portion 35 of the flange 36, said flange thereby transmitting the escapement motor torque through the torque amplifying counter-shaft 44 and to the gear 47, pawls 50 and drum 52 and as the revolving of the drum 52 increases the weights 56 carried thereby will again, if warranted, peripherally engage the annulus 30 of the flange 29.

While the disclosure of the invention is that of a device employing mechanical means for the useful applying of slip torque values of the sleeve 13 through torque amplifying counter-shaft system to load shaft, other means such as electrical means may be advantageously used for accomplishing the same purposes.

What I claim is:

1. A transmission gearing system having a load shaft, a dual planet gear system supported by said shaft, a power gear cooperable with one of said planet gears, an escapement means cooperable with said other planet gear, a counter shaft, gearing for said countershaft, centrifugally actuated means for clutching said gearing of said counter shaft to said escapement means, and other gearing extending from said countershaft to the load shaft.

2. A transmission gearing system comprising a load shaft, a dual planet gear system supported by said shaft, a power gear cooperable with one of said planet gears, a selective clutch comprising an escapement means and a cooperable gripping means, said escapement means being cooperable with said other planet gear, a countershaft, gearing for said countershaft, centrifugal clutching means cooperable with said gearing of said countershaft and said selective clutch, and uni-directional driving means cooperable with said counter shaft and said load shaft.

3. A transmission gearing system comprising a load shaft, a dual planet gear system supported by said shaft, a power gear cooperable with one of said planet gears, a selective clutch comprising an escapement element and a clutching element, said escapement element being cooperable with said other planet gear, and centrifugal clutching means cooperable with said clutching element of said selective clutch and said load shaft.

4. A transmission gearing system having a load shaft, a dual planet gear system supported by said shaft, a power gear cooperable with one of said planet gears, an escapement means cooperable with said other planet gear, a counter shaft, gearing for said countershaft, centrifugally actuated means for clutching said gearing of said counter shaft to said escapement means, and other gearing cooperable with said countershaft and said load shaft when the load shaft is operating below a predetermined speed of rotation.

5. A transmission gearing system comprising a load shaft, a dual planet gear system supported by said shaft, a power gear cooperable with one of said planet gears, an escapement gear cooperable with said other planet gear, manually selective clutching means having a part which is cooperable with said escapement gear, and centrifugal clutching means cooperable with another part of said selective clutching means and said load shaft when the load shaft is operating above a predetermined speed of rotation.

6. A transmission gearing system having a load shaft, a dual planet gear system supported by said shaft, a power gear cooperable with one of said planet gears, a selective clutch comprising an escapement element and a clutching element, said escapement element being cooperable with said other planet gear, a counter shaft, gearing for said counter shaft, centrifugally actuated means for clutching said gearing of said counter shaft to said clutching element other gearing connecting said countershaft to the load shaft when the load shaft is operating below a predetermined speed of rotation, and a second centrifugal clutching means cooperable with said clutching element of said selective clutch and said other gearing when the load shaft is operating above a predetermined speed of rotation.

7. A transmission gearing system comprising a load shaft, a dual planet gear system supported by said shaft, a power gear cooperable with one of said planet gears, centrifugal clutching means actuated from said load shaft, and a selective clutch having a part which is cooperable with said other planet gear and another part which is cooperable with said centrifugal clutch and said load shaft.

8. A power transmission system comprising a power shaft, a load shaft, a planet gear system, a selective clutch comprising an escapement element and a clutching element, said power shaft being cooperable with one of said planet gears, said escapement element being cooperable with the other planet gear, a centrifugal clutch cooperable with said clutching element, a counter shaft having gearing cooperation with said centrifugal clutch, a second centrifugal clutch secured to said load shaft having cooperation with the clutching element of said selective clutch, and other gearing from said countershaft cooperable with said second mentioned centrifugal clutch.

9. A power transmission system comprising the combination of a power shaft, a load shaft, a planetary gear system through which both of said shafts are cooperably connected, a sun pinion on the load shaft in mesh with said planet gear system, and a selective clutch and a centrifugally actuated clutch in series with said sun pinion and said load shaft respectively.

10. A power transmission system comprising the combination of a power shaft, a load shaft, a planetary gear system through which both of said shafts are connected, a selective clutch, a centrifugal clutch, a sun pinion turnable on said load shaft having cooperable relation with said centrifugal clutch through said selective clutch, a countershaft having gearing cooperation with said centrifugal clutch and said load shaft, and a second centrifugal clutch secured to said load shaft having cooperation with said sun pinion through said selective clutch.

11. A power transmission system comprising the combination of a power gear, a load shaft, a sun pinion on said load shaft, a planetary gear system supported from said shaft in mesh with said power gear and said sun pinion, and a selective clutch and a centrifugally actuated clutch in series with said sun pinion and said shaft.

12. A power transmission system comprising the combination of a power gear, a load shaft, a sun pinion on said load shaft, a planetary gear system supported from said shaft in mesh with said power gear and said sun pinion, and a selective clutch and a centrifugally actuated clutch in series with said sun pinion and said shaft when the shaft is operating above a predetermined speed of rotation.

13. A power transmission system comprising the combination of a power gear, a load shaft, a planetary gear system supported from said shaft in mesh with said power gear, a sun pinion loosely mounted on said shaft in mesh with one of the gears of said planetary system, a selective clutch and a centrifugally actuated clutch in series, said selective clutch being cooperable with said sun pinion, and torque amplifying means connected with said centrifugal clutch and extending to said load shaft.

14. A power transmission system comprising a load shaft, a sleeve mounted on said load shaft, a planetary gear system supported from said load shaft at one end, a sun pinion loosely mounted on said load shaft in mesh with said planet gear system, a selective clutch secured on said sleeve cooperable with said sun pinion, a centrifugal clutch having a part secured to said sleeve and a cooperating part loosely mounted on said sleeve, torque amplifying means connected to said part of the centrifugal clutch which is loosely mounted on said sleeve extending to said load shaft, and a second centrifugal clutch mounted on said load shaft adapted to cooperate with said sleeve.

15. A power transmission system comprising a load shaft, dual planet gears supported from said shaft, a power gear in mesh with one of said planet gears, a sun pinion loosely mounted on said load shaft in mesh with another of said planet gears, a sleeve mounted on said shaft having a gripping element which is cooperable with said sun pinion, torque amplifying means having connection with said shaft, means carried by said sleeve for automatic gripping cooperation with said amplifying means, and other means cooperable with said shaft for automatic gripping relation with said sleeve.

16. A power transmission system comprising a load shaft, dual planet gears supported from said shaft, a power gear in mesh with one of said planet gears, a sun pinion loosely mounted on said load shaft in mesh with another of said planet gears, a sleeve mounted on said shaft having a gripping element which is cooperable with said sun pinion, torque amplifying means including uni-directional driving means having connection with said load shaft, means carried by said sleeve for automatic gripping cooperation with said amplifying means, and other means cooperable with said shaft for automatic gripping relation with said sleeve.

17. A transmission gearing system comprising a load shaft, a dual planet gear system supported by said shaft, a power gear cooperable with one of said planet gears, centrifugal clutching means actuated from said load shaft, and a selective clutch having a part which is cooperable with said other planet gear and another part which is cooperable with said centrifugal clutch, and torque amplifying means connected with said centrifugal clutch and said load shaft.

18. A transmission gearing system comprising a load shaft, a dual planet gear system supported by said shaft, a power gear cooperable with one of said planet gears, a selective clutch comprising an escapement element and a clutching element, said escapement element being cooperable with said other planet gear, torque amplifying means connected to said load shaft, and centrifugal clutching means cooperable with said clutching element of said selective clutch and said amplifying means.

19. A power transmission system comprising the combination of a power gear, a load shaft, a sun pinion on said load shaft, a planetary gear system supported from said shaft in mesh with said power gear and said sun pinion, and a selective clutch and a pair of centrifugally actuated clutches in series with said sun pinion and said shaft.

20. A power transmission system comprising the combination of a power gear, a load shaft, a sun pinion on said load shaft, a planetary gear system supported from said shaft in mesh with said power gear and said sun pinion, and a selective clutch and a pair of centrifugally actuated clutches in series with said sun pinion and said shaft, said selective clutch adapted to be alternatively coupled in series with either of said centrifugal clutches when the load shaft is operating either above or below a predetermined speed of rotation, said selective clutch when coupled in series with respective centrifugal clutches being unified with said sun pinion and said load shaft.

21. A power transmission system comprising the combination of a power gear, a load shaft, a sun pinion on said load shaft, a planetary gear system supported from said shaft in mesh with said power gear and said sun pinion, torque amplifying means, and a selective clutch and a centrifugally actuated clutch in series with said sun pinion and said shaft through said torque amplifying means.

22. A power transmission system comprising a load shaft, a sleeve mounted on said load shaft, a planetary gear system supported from said load shaft at one end, a sun pinion loosely mounted on said load shaft in mesh with said planet gear system, a selective clutch secured on said sleeve cooperable with said sun pinion, a centrifugal clutch having a part secured to said sleeve and a cooperating part loosely mounted on said sleeve, and torque amplifying means connected to said part of the centrifugal clutch which is loosely mounted on said sleeve extending to said shaft.

HERBERT J. KRATZER.